C. M. SPENCER.
Magazine Gun.
No. 2,235
Reissued May 1, 1866.
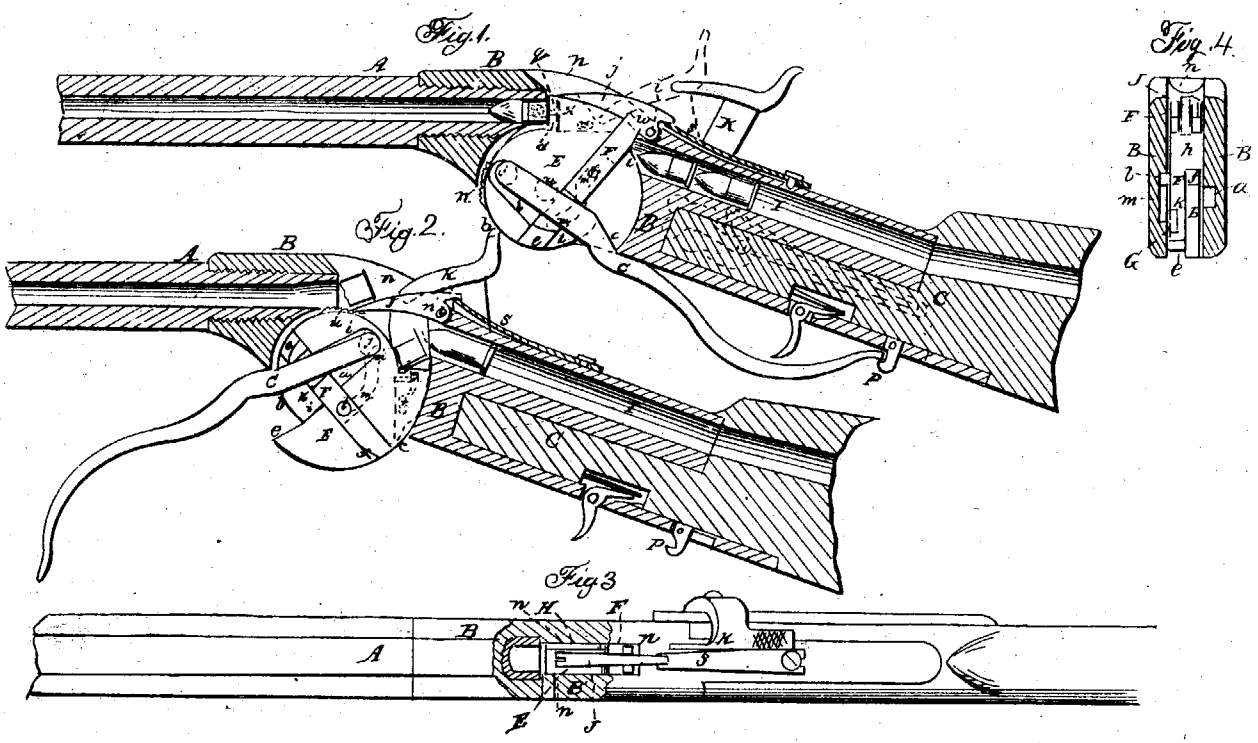
Witnesses
C. B. Spencer
J. W. Cornish
Inventor
C. M. Spencer
per Munn & Co Attorneys

UNITED STATES PATENT OFFICE.

THE SPENCER REPEATING RIFLE COMPANY, OF BOSTON, MASSACHUSETTS, ASSIGNEES, BY MESNE ASSIGNMENTS, OF C. M. SPENCER.

IMPROVEMENT IN SELF-LOADING FIRE-ARMS.

Specification forming part of Letters Patent No. 27,393, dated March 6, 1860; Reissue No. 2,235, dated May 1, 1866.

*To all whom it may concern:*

Be it known that I, CHRISTOPHER M. SPENCER, formerly of South Manchester, in the county of Hartford, in the State of Connecticut, now of Boston, in the State of Massachusetts, have invented certain new and useful Improvements in Breech-Loading Fire-Arms; and I do hereby declare the following to be a full and correct description of the same, reference being had to the accompanying drawings, in which—

Figure 1 is a longitudinal sectional view of the breech and parts of the stock, magazine, and barrel of a gun having my improvement, exhibiting it in condition for firing. Fig. 2 is a similar sectional view, exhibiting the parts in their relative positions at one stage in the operation of loading. Fig. 3 is a top view of the same, having the breech-holder partly broken away to expose the breech. Fig. 4 is a transverse section of the breech.

The same letter indicates the same part wherever it occurs.

My invention consists, first, in so constructing and arranging a rolling breech for a breech-loading arm that it shall operate as a carrier-block to receive the cartridge from the magazine, and by its forward rotation carry it to the chamber, while it also serves to cut off all communication between the chamber and magazine when the piece is loaded.

It consists, secondly, of a mode of locking the movable breech, whereby it is very firmly secured in place during the explosion of the cartridge, while it is readily unlocked and opened by the operation of one and the same lever, which serves, moreover, as the trigger-guard.

It consists, thirdly, of a serrated projection on the rolling breech, which engages with the flanges of the cartridge-case, and retracts it from the chamber when the breech is rotated in opening.

It consists, finally, in providing a tongue, arranged and operated substantially as hereinafter described, which serves to guide the case of the exploded cartridge out of the chamber, and prevent it from dropping back into the cavity of the breech-holder while on its way to the chamber.

To enable others skilled in the art to make and use my invention, I will proceed to describe its construction and operation.

A represents the barrel, screwed into the breech-holder B, which is secured by screws to the stock C. E is the rolling breech, consisting of a plate of steel of a thickness a little greater than the diameter of the bore of the barrel, and provided with a journal, *a*, on one side, which is fitted to turn in a bearing in one side of the breech-holder B, a portion, B′, of whose opposite side is made movable, to permit the introduction of the breech, which fits in a cavity in said holder. The figure of the breech is that of two arcs, *b c*, of different radius, concentric with the journal *a*, united by planes *d e*, nearly radial to the center of the said journal. The plane *d* forms the face of the breech. In the opposite side of the breech E to the journal *a* there is a groove, *e*, which meets a slot, *f*, cut directly through the breech, said groove and slot being in line with each other, one forming a continuation of the other, to receive the sliding bolt F, by which the breech is forced up toward the rear of the barrel. The broad part, *h*, (see Fig. 4,) of this bolt, which is received in the slot *f*, is made wedge-shaped at its end, to act as a wedge against the back of the opening *n* in the top of the breech-supporter, for the purpose of forcing the face of the breech up toward the barrel, and locking the breech in position for firing. In the same side of the breech as the groove *e* is a cavity, *i*, to receive the lever G, by which the breech is operated, said cavity being of less depth than the groove *e*, and of a width sufficient to permit the lever to move some distance in a direction corresponding with the movement of the breech without imparting any movement to the latter. The said lever is attached to the breech by means of a stud, *j*, which enters a recess in the back of the cavity *i*. In the outer side of the sliding bolt F is a recess, *k*, to receive the lever G, which is arranged to lie across the said bolt, and to the same side of the said bolt F there is rigidly attached a pin, *l*, which enters a recess, *m m′*, in the movable plate B′ of the breech-holder. The form of this recess, which is indicated in dotted outline in Figs. 1 and 2, is that of an arc, *m*, concentric with the journal *a* of the breech, with an offset, *m'*, at the upper end.

The lever G forms the trigger-guard, and when the breech is shut, as shown in Fig. 1, the rear end of the said lever is caught by a spring-catch, *p*, arranged under the breech-holder B, and in this position of the lever the bolt F enters the opening *n* and securely locks the breech.

The face *d* of the breech need not be fitted to make a tight joint with the rear muzzle of the barrel, as the joint may be made tight by the flange at the rear end of a metallic cartridge, as shown in Fig. 1, where a cartridge is shown, in red lines, in the chamber.

To open the breech the catch *p* is pulled back to liberate the lever G, and that lever is then drawn down away from the stock.

During the first part of the movement of lever G the breech does not move with it, owing to the play provided in the cavity *i* for the purpose of enabling the breech to be first unlocked by drawing the bolt F from the opening *n*; but by the time the bolt F is drawn the lever G comes into contact with the side of the cavity *i*, and moves the breech to the position shown in Fig. 2, such as to permit a cartridge to be introduced by hand through the upper opening of the breech-holder, or to be received in front of the face *d* of the breech from the magazine I in the stock.

In moving the lever G back to close the breech the lever does not move in the cavity *i* till the breech is nearly closed; but it is caused to move the breech by the pin *l* of the bolt being confined to the eccentric portion *m* of the groove *m m'*.

Just as the breech is nearly closed the pin *l* arrives in the offset portion *m'* of the groove *m m'*, and permits the bolt F to be moved up into the opening *n*, to lock and tighten the breech by the movement of the lever G in the cavity *i*.

In the side of the breech E opposite to that on which the lever G is arranged is a cavity to receive a slide, H, upon which the hammer K acts to cause the explosion of the charge.

The cartridge is intended to contain in its rear part percussion-priming, which will be caused to explode by being punctured, and the slide H is furnished with a point which effects such puncture when the slide is driven forward by the hammer falling against it.

The said slide is attached to the breech by a screw or pin, *r*, which passes through a slot in the slide, and is made fast in the breech.

On the smaller arc, *b*, of the face of the breech there is a narrow serrated projection, *u*, whose function is to catch the flange of the case of the exploded cartridge and pull it out from the chamber as the breech is opened.

In the opening *n* of the breech-holder there is placed a tongue, J, which is hinged at *t* to the breech-holder at the back of the opening, and which has a spring so applied as to cause the front extremity of the tongue constantly to bear down upon the breech.

This tongue, as the breech opens, drops down over the face *d* onto the smaller arc of the breech, and thus serves to prevent the exploded cartridge-case from dropping back into the cavity of the breech-holder, and also to guide it out of that cavity as the serrated projection *u* draws it out of the chamber.

This tongue, moreover, serves to prevent the cartridges from dropping out of the magazine when the breech is opened, and to guide them therefrom, and hold them in a proper position in front of the face *d* of the breech to be forced into the chamber by the act of closing the breech.

The cartridges may be forced out of the magazine I, as required, by a spring; or they may be made to drop one at a time into the cavity of the breech-holder, when the breech is opened, by holding the piece muzzle downward. As the breech closes it pushes the tongue J upward out of its way.

To prevent the movements of the tongue from being obstructed by the locking-bolt, the end of the latter is grooved to let the tongue work in it, and the front end of the tongue is grooved to allow the projection *u* to pass it without interference.

Having thus fully described my invention, what I claim therein, and desire to have secured by Letters Patent to the Spencer Repeating Rifle Company, is—

1. The combination of the rolling breech E, the lever G, and sliding locking-bolt F, the whole fitted and applied substantially as herein set forth.

2. The slide H, applied to the rolling breech and operating in combination with the hammer, substantially as described.

3. The rolling breech E, constructed as described, to operate as a carrier-block to receive the cartridge from the magazine and deposit it in the chamber in the end of the barrel, and also to cut off all communication between the chamber and the magazine when the piece is loaded.

4. The serrated projection *u*, constructed, arranged, and operating as described.

5. The tongue J, constructed, arranged, and operating as described.

The above specification of the said invention signed and witnessed at Boston this 25th day of March, A. D. 1865.

CHRISTOPHER M. SPENCER.

Witnesses:
W. H. RICHARDSON,
CHAS. F. STANSBURY.